United States Patent
Haldar et al.

(10) Patent No.: US 7,287,064 B1
(45) Date of Patent: Oct. 23, 2007

(54) METHOD AND SYSTEM FOR DETERMINING AN INTERNET USER'S INTEREST LEVEL

(75) Inventors: Debashis Haldar, Olathe, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 595 days.

(21) Appl. No.: 09/998,304

(22) Filed: Nov. 20, 2001

(51) Int. Cl.
*G06F 15/16* (2006.01)

(52) U.S. Cl. ...................................... 709/217; 709/203

(58) Field of Classification Search ................ 709/202, 709/203, 217–219, 225, 232; 707/1–10
See application file for complete search history.

(56) References Cited

U.S. PATENT DOCUMENTS

| | | | |
|---|---|---|---|
| 5,159,592 A * | 10/1992 | Perkins | 370/338 |
| 5,168,565 A * | 12/1992 | Morita | 707/3 |
| 5,694,594 A * | 12/1997 | Chang | 707/6 |
| 5,724,567 A * | 3/1998 | Rose et al. | 707/2 |
| 5,821,929 A * | 10/1998 | Shimizu et al. | 382/190 |
| 5,825,759 A * | 10/1998 | Liu | 370/331 |
| 5,940,843 A * | 8/1999 | Zucknovich et al. | 715/516 |
| 6,009,410 A * | 12/1999 | LeMole et al. | 705/14 |
| 6,088,707 A * | 7/2000 | Bates et al. | 715/501.1 |
| 6,108,674 A * | 8/2000 | Murakami et al. | 715/515 |
| 6,178,419 B1 * | 1/2001 | Legh-Smith et al. | 707/6 |
| 6,266,664 B1 * | 7/2001 | Russell-Falla et al. | 707/5 |
| 6,349,307 B1 * | 2/2002 | Chen | 707/103 X |
| 6,374,237 B1 * | 4/2002 | Reese | 707/3 |
| 6,460,036 B1 * | 10/2002 | Herz | 707/10 |
| 6,539,375 B2 * | 3/2003 | Kawasaki | 707/5 |
| 6,654,735 B1 * | 11/2003 | Eichstaedt et al. | 707/3 |
| 6,678,690 B2 * | 1/2004 | Kobayashi et al. | 707/101 |
| 6,718,063 B1 * | 4/2004 | Lennon et al. | 382/224 |
| 6,871,236 B2 * | 3/2005 | Fishman et al. | 709/246 |
| 6,978,266 B2 * | 12/2005 | Larason et al. | 707/5 |
| 7,028,253 B1 * | 4/2006 | Lieberman et al. | 715/512 |
| 7,058,566 B2 * | 6/2006 | Shaw | 704/9 |
| 7,139,972 B2 * | 11/2006 | Hamilton et al. | 715/513 |
| 2001/0020238 A1 * | 9/2001 | Tsuda | 707/5 |
| 2002/0049868 A1 * | 4/2002 | Okada et al. | 709/330 |

OTHER PUBLICATIONS

Cooper et al., MCSE Supporting and Maintaining a Windows NT® Server 4.0 Network, 2001, New Readers Publishing (Library of Congress Card No.: 2001090357), Whole book, in particular chapter 7 and 9.*

(Continued)

*Primary Examiner*—Joseph E. Avellino (57) ABSTRACT

A method and system for measuring an Internet user's level of interest in one or more subjects. For a given subject, web pages that are sent to the user are analyzed to determine how many keywords related to the given subject appear in the web pages. The keyword count is then used as a basis to establish a measure of the user's interest level in the given subject. The analysis may take various forms and can be carried out over successive time periods, so as to regularly update a measure of the user's interest level in the subject. Provided with a measure of the user's interest level in a given subject, a service provider can then tailor services for the user accordingly.

12 Claims, 4 Drawing Sheets

OTHER PUBLICATIONS

ISS'97: World Telecommunication Congress, "Global Network Evolution: Convergence or Collision?," Proceedings, vol. 1, pp. 285-293, (Sep. 1997).

Faster Web Sorting, Same Lines, Less Junk, http://hyperarchive.lcs.mit.edu/telecom-archives/archives/telecomine.e-zine/98-11and 12, vol. 11, (Nov./Dec. 1998).

* cited by examiner

METHOD AND SYSTEM FOR DETERMINING AN INTERNET USER'S INTEREST LEVEL

BACKGROUND

1. Field of the Invention

The present invention is directed to a method and system for determining (i.e., measuring, predicting or estimating) an Internet user's interest level.

2. Description of Related Art

In recent years, the Internet and the world wide web have become ubiquitous. The sheer volume of information and services available at any time via the Internet is astounding. As such, users often turn to the Internet to communicate with others, to receive current news reports, to shop, to be entertained, and for assorted other reasons.

As its name implies, the Internet is a network of computer networks. The world wide web is, in turn, an application that runs on the Internet, powered by web servers and web browsers. A web server stores "web pages" made up of documents and files (e.g., text, graphics, audio, video or other media and logic) and can send them to client web browsers that access the server via hypertext transfer protocol (HTTP) or another agreed protocol.

A user operating a web browser can direct the web browser to navigate to a particular web page. To do so, the user may enter into the browser a network address of the web page, either expressly or through use of a hyperlink or other logic embedded in a web page or in the browser. The network address can be a raw Internet Protocol (IP) address. Alternatively, the network address can be a textual address known as a universal resource locator (URL), which a network domain name server (dedicated address translation computer) can translate into a corresponding IP address. The browser may then send an HTTP "GET" request to a server at the IP address, and the server may responsively send the web page to the browser, to be displayed to the user.

Typically, a user accesses the Internet through an Internet Service Provider (ISP) system (e.g., a network access server). The user's computer physically links to the ISP system through a suitable communication channel, such as a dial-up telephone connection or a local area network (LAN) connection (e.g., Ethernet, cable, DSL, etc.), which may include wired and/or wireless components. In turn, the ISP then provides connectivity with the Internet. Consequently, as the user navigates through the world wide web, the user's navigation requests and the resulting web pages pass through the ISP on their way to and from the user's computer. Often, an ISP maintains its own web server as well, for use in providing information and services to its users.

In addition, the telecommunications industry has recently embraced a concept known as "mobile IP." Mobile IP enables a user's computer to be now know connected with most any network on the Internet and to be able to send and receive communications over the Internet. According to mobile IP, each user's computer has a "home agent" server, which maintains authentication and service qualification information for the user.

When the computer is connected to a foreign network, a "foreign agent" server on the network registers the computer with the home agent. In turn, communications to the computer are routed through the home agent, to the foreign agent, and on to the computer. For instance, if a user's computer sends out an HTTP GET request to a web server, the foreign agent might encapsulate the request with a header that designates the home agent as the return address. Consequently, the web server would send the requested web page to the user's home agent, and the home agent would then forward the web page to the foreign agent and on to the user's computer. Thus, in the mobile IP realm, communications with a user's mobile computer, such as navigation requests and resulting web pages, will pass through the user's home agent.

SUMMARY

The present invention is directed to a method and system for gauging an Internet user's interest level in one or more subjects. Provided with knowledge of a user's level of interest in one or more subjects, a service provider can better tailor services to suit the user.

For example, if a service provider determines that a user is interested in music, the service provider can customize a web page that is accessed by the user, to provide music-related information in the web page. As another example, if a service provider determines that a user is interested in electronics, the service provider could send a message to the user, providing the user with an advertisement, a coupon, or news about electronics. And as still another example, if a service provider determines a user's relative interest among a number of subjects, the service provider could sort information based on the user's relative interest level, before providing the information to the user. Other examples are possible as well.

According to an exemplary embodiment of the invention, an entity can establish a measure of a user's interest level in a particular subject based on the frequency with which keywords associated with that subject appear in web pages that the user visits on the Internet. The entity can perform this analysis over time and for various subject matter categories, so as to regularly update measures of the user's interest level for the various categories. Further, the entity can normalize these measures, so as to be able to compare the user's interest levels among the various categories.

Thus, in one respect, an exemplary embodiment of the invention could take the form of a method for measuring an Internet user's level of interest in a given subject. The method may involve establishing a count of web pages sent to a user that each contain at least a threshold number of keywords related to the given subject, and using the count as a basis to establish a measure of the user's interest in the given subject. Alternatively, the method may involve establishing a count of keywords related to the given subject that appear in web pages sent to the user, and using that count as a basis to establish a measure of the user's interest in the given subject. In either instance, the process of using the count to establish the measure could involve concluding that the measure is the count.

In another respect, the method of measuring an Internet user's interest level in a given subject could involve establishing for the user (i) a total page count value, P, that represents a number of web pages sent to the user (i.e., on their way, to be sent, or already sent to the user), (ii) a subject-specific page count value, S, that represents a number web pages sent to the user that each contain at least a threshold number of keywords related to the given subject, and (iii) a keyword count value, K, that represents a number of keywords related to the given subject that appear in web pages sent to the user. In turn, the method could involve using the values P, S and K, in combination, to establish a measure of the user's interest level in the given subject. For instance, the method could involve computing the measure as (K)(S)/(P), or applying some other algorithm. The resulting measure could then be normalized, such as by comparison to other such measures.

Further, the method could involve performing the analysis over each of a number of successive periods of time, so as to establish respectively for each period of time a measure of the user's interest level in the given subject. The method may then involve combining (e.g., adding together or otherwise combining) the respective measures of the user's interest level over time to establish a composite measure of the user's interest level in the given subject.

In yet another respect, an exemplary embodiment could take the form of a method of providing a service keyed to user interest level in a given subject. In this regard, the method could involve establishing a count of keywords and/or pages considered to be relevant to the subject, using the count as a basis to establish a measure of the user's interest in the subject, and using the measure as a basis to provide a service for the user (e.g., as a way to target, modify or customize a service for the user).

In still another respect, an exemplary embodiment could take the form of a machine readable medium on which is stored a set of machine language instructions that are executable by a processor to carry out any of the methods described herein. For example, the machine readable medium could be a computer disk drive, a compact disc, a tape, a memory (volatile or nonvolatile) or some other storage medium.

Further, in yet another respect, the exemplary embodiment could take the form of a gateway or other entity through which web pages pass on their way to a user. The gateway or other entity could comprise a processor, data storage, and program instructions that are executable by the processor (i) to establish a count of a number of keywords related to a given subject that appear in web pages sent to the user, and (ii) to use the count as a basis to establish a measure of the user's interest level in the given subject.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
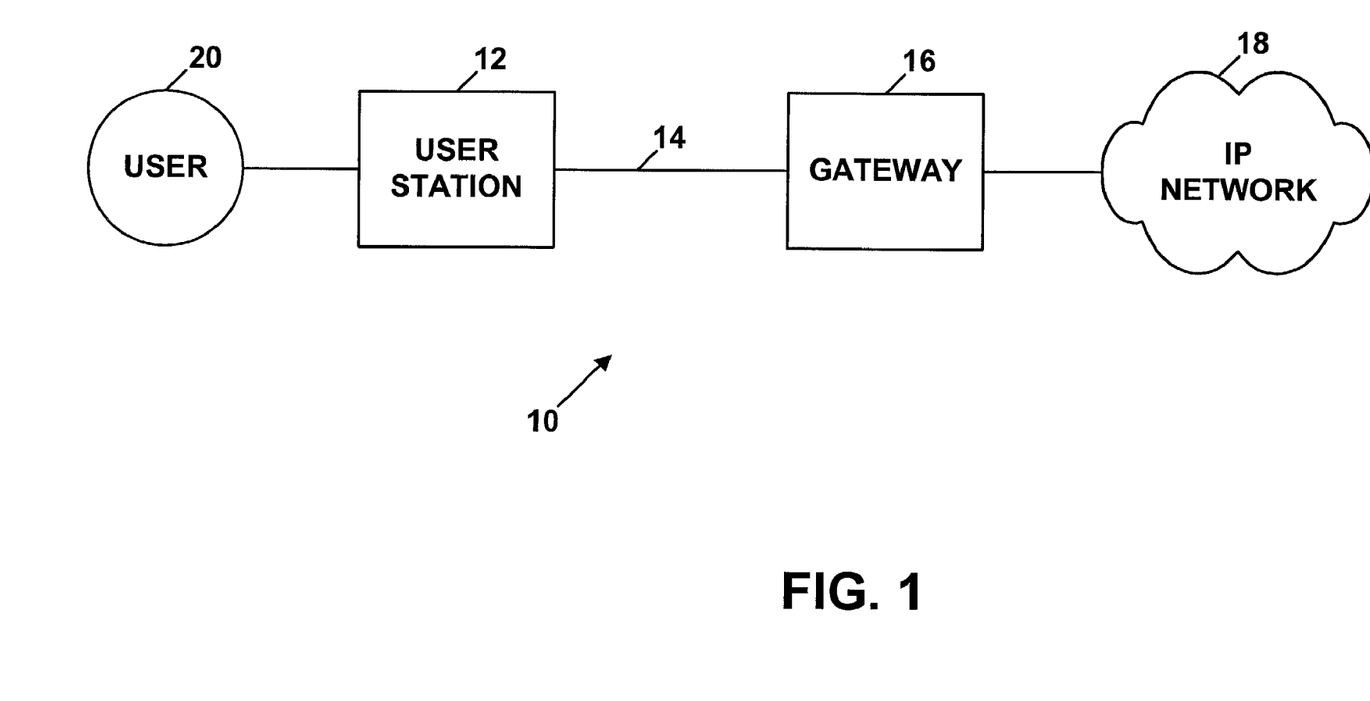
FIG. 1 is a block diagram of a communication system in which the exemplary embodiment can be employed.

Referring to the drawings, FIG. 1 illustrates a communication system 10 in which an exemplary embodiment of the present invention can be employed. System 10 includes a user station 12 coupled by a link 14 with a gateway 16. The gateway 16 in turn provides connectivity with an IP network 18, such as the Internet or an intranet for instance. Further, a user 20 is shown at the user station 12.

It should be understood that this and other arrangements described herein are illustrative only, and other arrangements and other elements (e.g., machines, interfaces, functions, orders of functions, etc.) can be used instead and some elements may be omitted altogether. In this regard, it should be understood that many of the entities shown in the figures are functional in nature and, as such, may be physically embodied in a variety of forms and may be implemented as discrete components or in conjunction with other components (whether or not shown), in any suitable combination and location.

In the arrangement shown in FIG. 1, user station 12 should function to communicate with gateway 16 and in turn with web servers that reside on IP network 18. As such, the user station could take any of a variety of forms. For instance, it could be a personal computer (such as a desktop or notebook computer), a handheld wireless device (such as a cellular telephone or personal digital assistant (PDA)), or any other sort of device now known or later developed.

To be able to communicate with gateway 16, the user station is preferably equipped (e.g., connected) with a communication interface that facilitates physical communication via link 14 with the gateway. The communication interface can take various forms. As examples, it could be a dial-up modem, a cable modem, a DSL modem or an interface with a LAN server that provides connectivity with link 14.

To be able to communicate in turn with web servers on the IP network, user station 12 preferably includes or has access to a processor and a web browser application executable by the processor to be able to send requests for web pages and receive web pages in response. Examples of suitable web browser applications include Internet Explorer (available from Microsoft Corporation), Netscape Navigator (available from Netscape), and Openwave Mobile Browser (available from Openwave Systems, Inc.) Further, the user station preferably includes a mechanism, such as a display screen and speakers, to present the web pages to user 20.

Link 14 between the user station 12 and the gateway 16 can also take various forms, possibly depending on the type of communication interfaces employed by the user station and the gateway. (Conversely, the communication interfaces employed by these entities can depend on the type of link connecting them.) Examples of suitable links are (or include) coaxial cable, twisted pair copper wire, fiber, and/or various wireless links.

As a general matter, gateway 16 sits functionally between user station 12 and web servers on the IP network 18, so that IP communications between the user station and web servers pass through the gateway. (Note that gateway 16 may itself also embody such a web server.) In the exemplary embodiment, at least IP communications traveling to the user station, such as web pages requested by the user, pass through gateway 16. However, IP communications traveling from the use station, such as requests for such web pages, may also pass through gateway 16.

As such, gateway 16 can take various forms. For example, gateway 16 could be an ISP system, which provides network connectivity for user station 12. As another example, gateway 16 could be a mobile-IP home agent, through which IP communications travel on their way to the user station. Other examples are possible as well.

Figure 2:
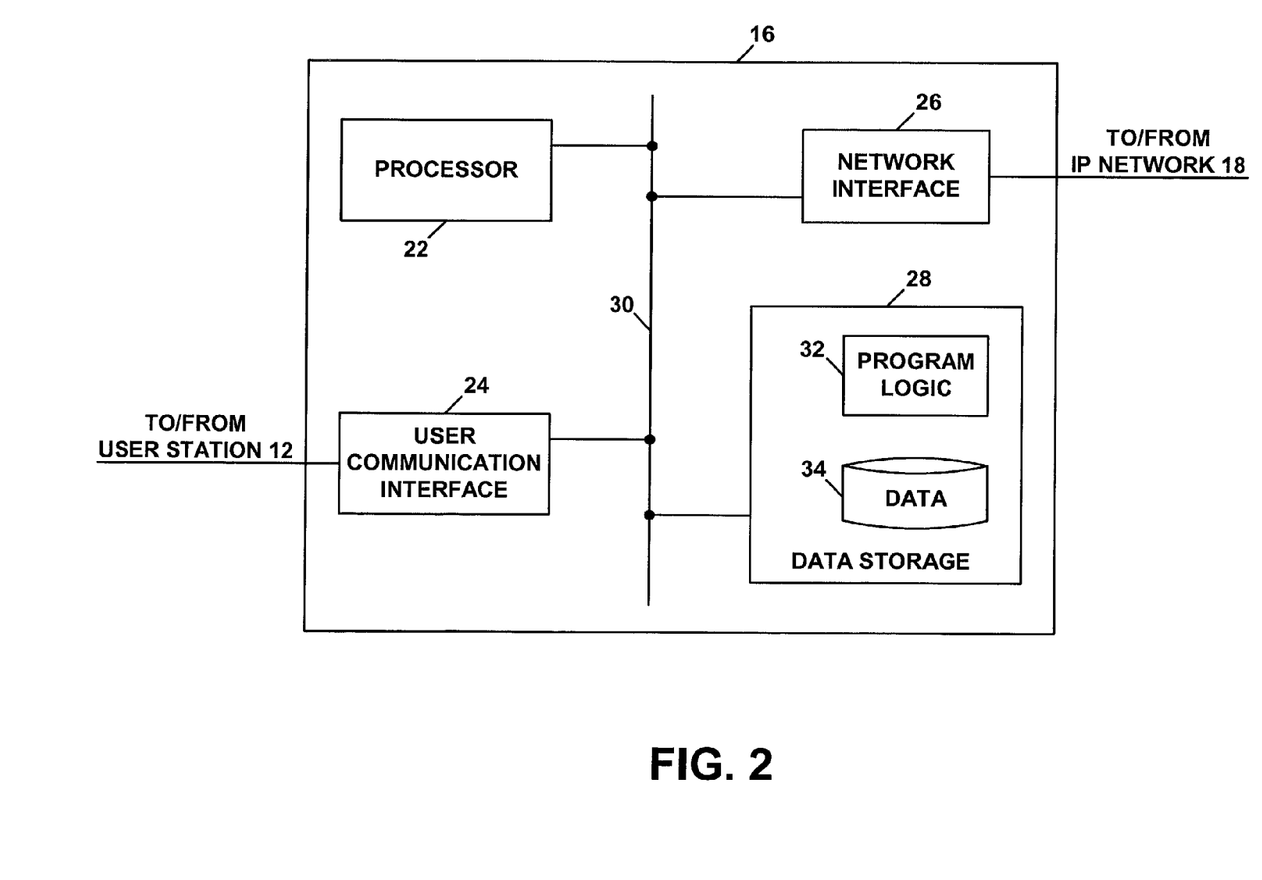
FIG. 2 is a block diagram of a gateway arranged to measure user interest levels according to the exemplary embodiment.

Referring next to FIG. 2, a simplified block diagram of an exemplary gateway 16 is shown. The exemplary gateway 16 includes or has access to a processor 22, a user communication interface 24, a network interface 26, and data storage 28, all of which may be coupled together by a system bus 30.

(Note that some of the components shown in FIG. 2 could be distributed and/or combined in various ways. For instance, a part or all of data storage 28 could be embodied within processor 22. As another example, user communication interface 24 could be combined with network interface 26. And as still another example, some functionality of processor 22 might be incorporated into the user communication interface 24 and/or into the network interface 24. Other examples are possible as well.)

In the exemplary embodiment, the user communication interface 24 functions to facilitate communication with user station 12 via link 14 and can therefore take various forms. For example, the user communication interface could be a dial-up modem, which interfaces with a T1 line coming from a telephone company central office (thereby supporting dial-up telephone connections). As another example, the user communication interface could be a cable modem termination system, which interfaces via link 14 with a cable modem at user station 12. Other examples are possible as well.

The network interface 26, on the other hand, functions to facilitate communicate with IP network 18. As such, the network interface could send and receive IP packets via the IP packet network 18.

Data storage 28, in turn, may comprise cache memory, flash memory, and/or other volatile and/or nonvolatile storage, whether magnetic, electronic, fiber, or some other form. In the exemplary embodiment, as shown in FIG. 2, data storage 28 includes program logic 32 and data 34. The program logic 32 may take the form of machine language instructions executable by processor 22 to carry out various functions described herein. (Alternatively or additionally, that logic could be embodied in hardware and/or firmware.)

The data 34, on the other hand, may include information about user interest levels with respect to one or more subject matter categories. As such, the data may be maintained as a number of tables in a relational database format. The database could be configured in any of a variety of ways, the specifics of which are not necessarily critical. To illustrate by way of example, the database could include (i) a Category table, (ii) a Keyword table, (iii) a User table, (iv) a User Page-Count table, (v) a User/Category table, and (vi) a User History table.

In this arrangement, the Category table would indicate subject matter categories of interest, i.e., subjects as to which a service provider or other entity may wish to know users' interest levels. Examples of such categories may be general or specific, such as sports, baseball, soccer, football, books, fiction, science fiction, food, pizza, etc.

The Keyword table would indicate, for each subject matter category, one or more keywords that are considered to relate to the subject matter. For instance, keywords that may relate to baseball might include "baseball", "pitcher", "outfield", and "dugout". Each record of the keyword table may thus set forth a particular keyword and be keyed to a particular subject matter category of the category table. The Keyword table may also define for each keyword a respective value or weight (whether a fraction or a whole number).

The User table would identify each user whose interest is measured. The table could identify each user by any means. For instance, the table could identify a user by name or by personal network address (e.g., SIP address, Network Address Identifier, e-mail address, phone number, or personal station identifier).

The User Page-Count table would indicate, for each user, a count of the number of web pages that the user has visited during a current time period of analysis ("total page count").

Thus, each record of the user page-count table may be keyed to a user of the User table and may indicate a respective page count, which could be refreshed at the beginning of each new period of analysis.

The User/Category table would indicate for each user a measure of the user's interest level per subject matter category. Thus, each record of the User/Category table can be keyed to a particular user of the User table as well as to a particular category of the Category table, and each record may indicate a respective measure of user interest.

Further, each record of the user/category table would preferably indicate calculation values that have been accumulated so far for the user, with respect to the category, during a current time period of analysis. These values may include (i) an indication of how many web pages the user has visited during the period that each contain at least a threshold number of keywords related to the category ("category-specific page count") and (ii) an indication of how many such keywords related to the category have appeared, in total, in the web pages visited by the user during the time period ("keyword count").

And the User History table would, in turn, contain measures of user interest over time. For instance, each record in the User History table could be keyed to a particular user of the User table and to a particular subject matter category of the Category table. And each record could set forth, for a given date/time, a measure of the user's interest in that subject matter category. Advantageously, this table could be used to generate graphs or other output reports indicating whether and how the user's interest level changed with time.

In accordance with the exemplary embodiment, gateway 16 programmatically analyzes web pages that are sent to user 20 and, based on its analysis of those web pages, establishes or updates measures of the user's interest level in one or more subject matter categories. For one such subject matter category, this general process is illustrated by the flow chart set forth in FIG. 3.

Figure 3:
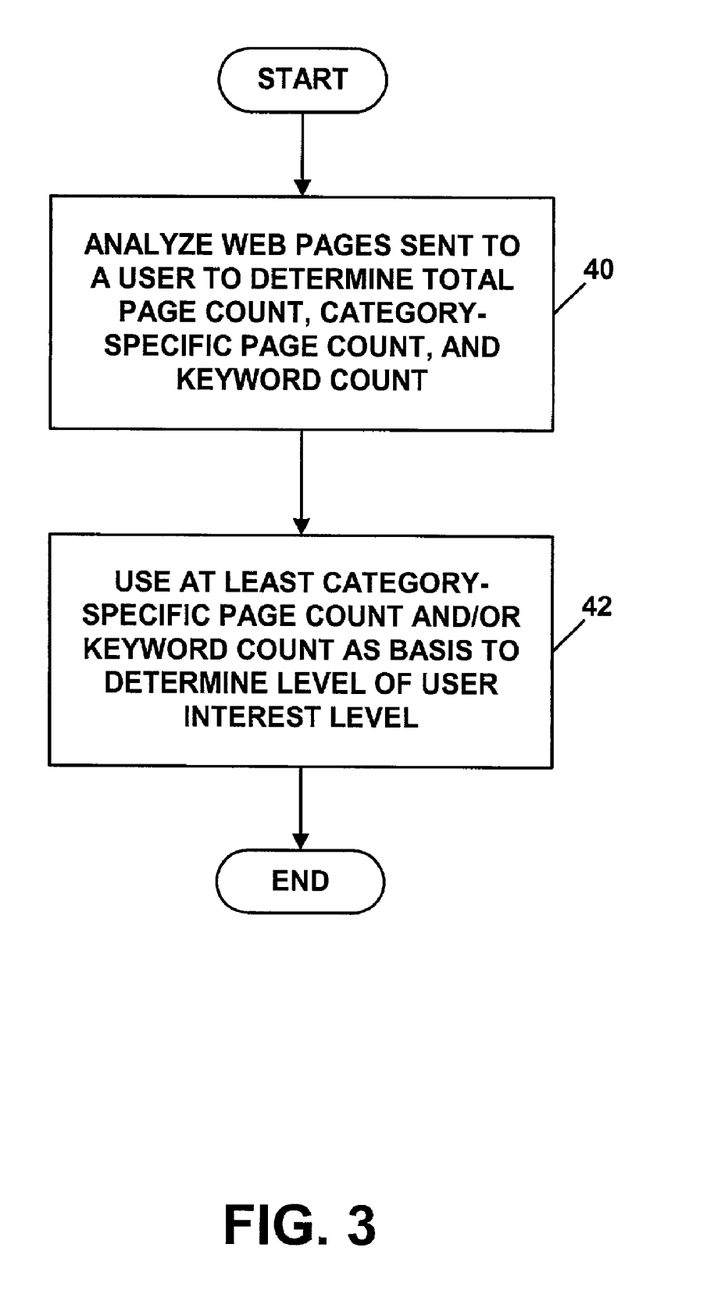
FIG. 3 is a flow chart depicting a set of functions that can be carried out according to the exemplary embodiment.

In particular, as shown in FIG. 3, at block 40, gateway 16 analyzes web pages that have been sent or are being sent to user 20 and thereby determines (i) the user's total page count, (ii) the user's category-specific page count, and (iii) the user's keyword count. In turn, at block 42, the gateway uses at least the category-specific page count and/or the keyword count as a basis to determine the user's level of interest in the subject matter.

The correlation between these values and the measure of user interest might be direct. For example, the user's category-specific page count can itself represent the user's interest level. (As such, a given user might have a higher measure of interest than another user, because the given user might access more web pages that include keywords related to the subject matter.) As another example, the user's keyword count can itself represent the user's interest level. (As such, a given user might have a higher measure of interest than another user, because the web pages accessed by the given user have more references to the subject matter.)

Alternatively, the correlation might involve some additional analysis. For example, the gateway could compute the user's level of interest to be the product of the user's keyword count and user's category-specific page count. This value would thus take into consideration not only how many pages accessed by the user are considered to relate at all to the subject matter category (as indicated by the category-specific page count), but also how much those pages relate (as indicated by the keyword-count).

As another example, the gateway could factor the user's total page count into the measure. For instance, the gateway could compute the user's interest level to be the product of (i) the user's keyword count and (ii) the ratio of the user's category-specific page count to the user's total page count. This measure would thus be higher as more of total number of pages accessed by the user included keywords that were considered to relate to the subject matter category. Conversely, the measure would be lower as fewer of the total number of pages accessed by the user included keywords that were considered to relate to the subject matter category.

To perform the analysis shown in FIG. 3, the gateway can at least temporarily store the web pages that are sent to the user and can then search through the web pages for instances of the keywords that are considered to relate to a given category. The gateway can do this one page at a time or can store multiple pages and analyze them at once. Typically, each web page will be defined by a set of source code (e.g., HTML, HDML, WML, or some other type of code). Therefore, one way to search for instances of keywords in a given web page would be to perform a simple text search through the source code that underlies the page.

It is recognized that some web pages may contain a substantial number of keywords related to a given category. To the extent keyword count is factored into the measure of user interest, those pages could disproportionately increase the measure of user interest in the given category. According to the exemplary embodiment, in order to temper the impact of such pages on the measure of interest, the gateway can be programmed to count no more than a predetermined maximum number of keywords (for a given category) per page. Thus, if the gateway counts more than that predetermined maximum number of keywords in a page, the gateway may use the maximum number as the keyword count instead.

Further, it is recognized that some keywords might be more relevant to a given category than others. As noted above, the Keyword table can indicate per keyword a respective weight or keyword value. In accordance with the exemplary embodiment, when establishing a keyword count, the gateway can multiply the number of occurrences of a given keyword by the keyword's weight (or, equivalently, for each instance of the keyword, the gateway can increment the keyword count by the weight of the keyword).

As also noted above, the category-specific page count is a count of pages that include at least a threshold number of keywords related to a given subject matter category. The threshold may be referred to as a page-relevance threshold and is a matter of choice. For example, the page-relevance threshold could be a single keyword, in which case the gateway would increment the category-specific page count by one in response to any page that includes at least one keyword related to the subject matter category. As another example, the page-relevance threshold could be 10 keywords, in which case the gateway would increment the category-specific page count by one in response to any page that includes at least 10 keywords related to the subject matter category. Further, the page-relevance threshold could differ from category to category or from user to user, if desired.

In the exemplary embodiment, for each user, the gateway may be programmed to perform this analysis over a given time period of time, such as over a number of minutes (e.g., 15 minutes), days (e.g., 2 days), or weeks (e.g., 1 week), so as to produce a measure of user interest for that period of time. Further, the gateway may be programmed to repeat this analysis for each subsequent period of time, such as every 15 minutes or every 2 days, and to combine together the measures of interest established for the subsequent periods of time so as to produce a composite or total measure of interest for the user.

This combining process may also take a variety of forms. For instance, over a first time period, the gateway might establish a principal measure of the user's interest in a given subject matter. In turn, over the next time period, the gateway might establish a new measure of the user's interest in that given subject matter. The gateway may then combine that new measure into the principal measure by adding it to the principal measure, thereby establishing a composite measure. Alternatively, the gateway might weight the new measure before adding it to the principal measure. (For instance, the gateway might add 0.7 of the new measure to 0.3 of the principal measure.) Still alternatively, the gateway could combine the measures together in some other way.

Figure 4:
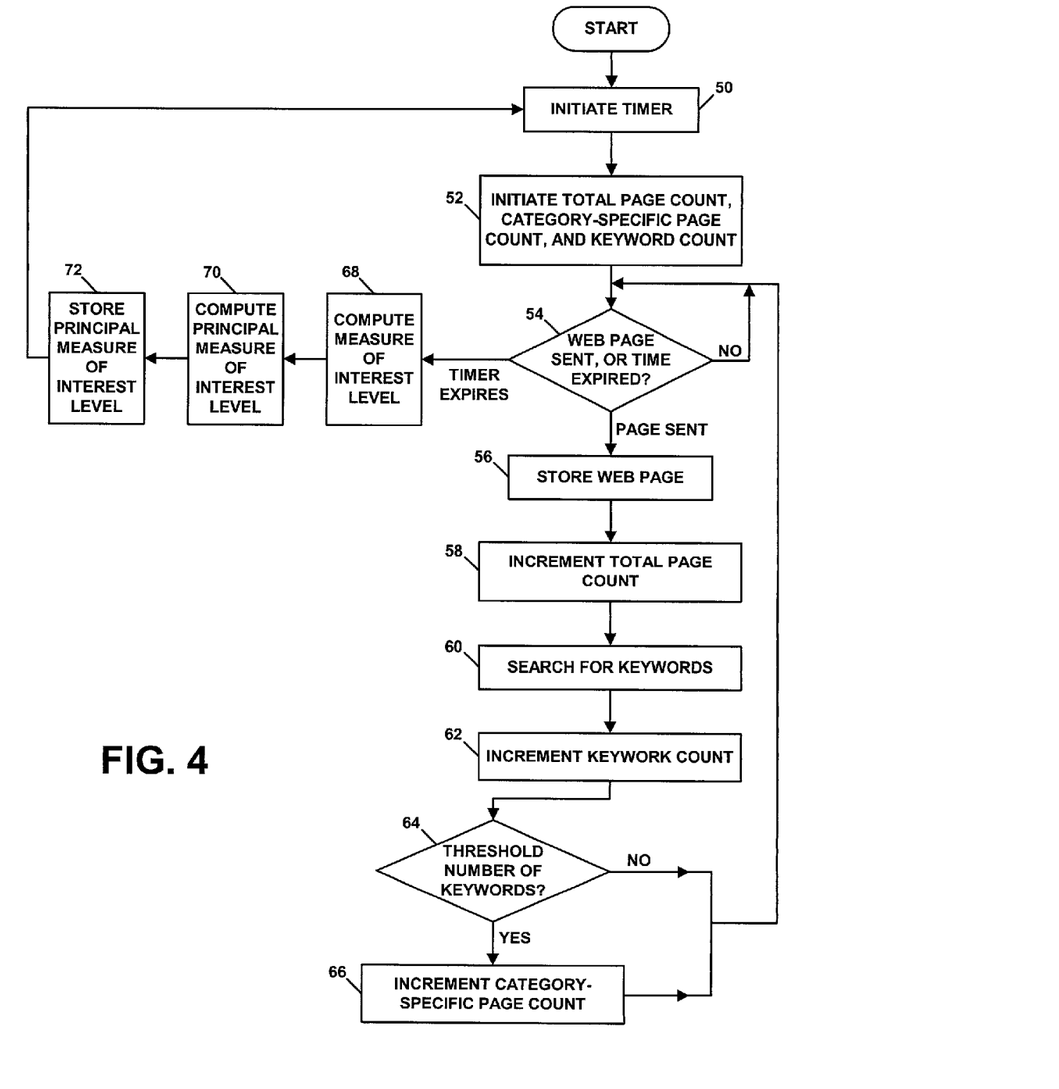
FIG. 4 is a flow chart depicting in more detail a set of functions that can be carried out according to the exemplary embodiment.

Turning now to FIG. 4, an example of the process is illustrated in more detail. The gateway could be set to carry out this process respectively for each of a number of users, so as to establish measures of the users' respective interest. As shown in FIG. 4, at block 50, gateway 16 initiates and begins decrementing a timer for a first period of analysis (such as 24 hours, for instance). Further, at block 52, the gateway initiates the user's total page count in the User Page-Count table, and the gateway initiates the user's category-specific page count and keyword count in the User table.

At block 54, the gateway then waits for a web page to be sent to the user or for the timer to expire. When a web page is sent to a user, at block 56, the gateway stores the web page in data storage 28. Further, at block 58, the gateway increments the user's total page count in the User Page-Count table by one, to reflect that an additional page has been sent to the user. (Note that the gateway could be programmed to increment the total page count only for each page that has been requested by the user, thereby excluding from the analysis any pages (such as pop-up ads) that are pushed to the user without the user's request.)

At block 60, for each subject matter category listed in the Category table (or for those as to which the user's interest level is at issue), the gateway then searches through the web page for keywords that are considered to relate to the subject matter category (as indicated in the Keyword table). At block 62, the gateway than increments the user's keyword count in the User Page Count table by the number of such keywords found in the page under analysis (possibly capping the number of keywords by a predetermined maximum number, as noted above). Further, at block 64, the gateway determines if the number of keywords found in the page meets the page-relevance threshold. If so, at block 66, the gateway increments the user's category-specific page count by one, to reflect that the user has accessed one more page related to the subject matter category.

The gateway then returns to block 54, to wait for a new page to be sent to the user or for the time to expire. If a new page is sent to the user, the process repeats itself, with the gateway incrementing the user's total page count and, per category, searching for keywords and incrementing the user's keyword count and category-specific page count (if appropriate).

When the timer expires, the gateway proceeds to block 68, where the gateway computes measures of the user's interest level per category, for the time period. (Alternatively, the gateway could be programmed to continuously compute measures of the user's interest level, factoring into the computation the new information gleaned from each new page.) Thus, applying one of the example computations described above, for each category, the gateway might multiply the user's keyword count by the user's category-specific page count, and the gateway might then divide the result by the user's total page count, so as to produce a new measure of user interest.

At block 70, for each category, the gateway then computes a principal measure of user interest. If a principal or composite measure of user interest existed already for the user (for the category), the gateway may read that measure from the User/Category table and may combine the new measure into that measure, such as by adding the new measure to the existing measure (possibly by taking a weighted sum, as described above). At block 72, the gateway then stores the principal measure of user interest in the User/Category table and in the User History table (with an associated date/time stamp).

Having finished its analysis for the current time period, the gateway then returns to block 50, where the gateway repeats the process for the next time period. Thus, the gateway would again initiate the timer as well as the user's total page count, category-specific page count (per category) and keyword count (per category). And the gateway would proceed to analyze pages sent to the user. At the end of the next time period, the gateway would then establish a new measure of user interest per category and would combine that into the existing, principal measure of user interest for the category, storing the results in the User/Category table and User History table.

In the exemplary embodiment, the gateway can normalize the measures of user interest that the gateway establishes (before or after storing the values in the database), so that the values can have more comparative meaning. This normalization process can take various forms. For example, provided with measures of a user's interest for multiple subject matter categories, the gateway could add all of the measures to produce a total and can then determine what fraction of the total each measure represents. Other examples are possible as well.

In addition to (or instead of) storing its measures of user interest level, the gateway can provide one or more output reports indicating its measure of user interest level. Alternatively, another entity could provide such output reports, based on the data established by the gateway. For example, a web server could link with data storage 28 and could provide authorized users with a web page that presents a report indicating user interest levels over time. Further, such a web page could be programmed to receive cross-tab query specifications from a user, to which the web server could respond by presenting the user with other more specific data or reports from data storage 28. Other examples are also possible.

With the benefit of the exemplary embodiment, an entity can provide a service that is based at least in part on a measure of user interest established by the gateway. The entity can take various forms. For example, the entity can be the gateway or can be an owner or operator of the gateway. As another example, the entity could be a third party service provider that has access to the measures established by the gateway (whether by querying the gateway or an associated entity or in some other manner). Such a third party provider might pay the gateway owner for the right to access the measures on a per-user basis or according to some other agreement.

The service that the entity provides may also take various forms. For example, given a measure of the user's interest in mystery books, the entity may determine whether the measure exceeds a predefined threshold level. If it does, then the entity might send an e-mail message to the user, reporting that a new mystery book has just been published. As another example, given the user's relative measures of interest in various subject matter categories, the entity might sort a list of hyperlinks related to those categories, based on the user's interest level, and may present the sorted list of hyperlinks on a web page when requested by the user.

An exemplary embodiment of the present invention has been described above. Those skilled in the art will understand, however, that changes and modifications may be made to this embodiment without departing from the true scope and spirit of the present invention, which is defined by the claims.

For example, while the foregoing description focuses mainly on conventional web pages that are accessed by a user operating a conventional web browser, the invention could extend as well to voice-based web pages, such as those that can be accessed by a user through a speech interface on a voice command platform. In that instance, user station 12 in FIG. 1 might be a conventional telephone (landline or wireless), and gateway 16 might be a voice command platform, which loads and executes voice-based web pages (e.g., VXML documents) and which communicates with the user via a voice link 14. In that arrangement, the gateway could still analyze web pages that are presented to the user and establish measures as described above.

As another example, while the foregoing describes an ISP and a mobile-IP home agent as examples of suitable gateways that can carry out the exemplary analysis, the analysis could equally well be carried out anywhere else, provided with access to web pages (or information about the content of web pages) that are accessed by the user. Thus, for instance, the analysis could be carried out by code running on user terminal 12. Such code could be executed as an add-on component to a conventional web browser (e.g., automatically analyzing all web pages that the browser retrieves) or in some other form. And, as another example, the analysis could be carried out by a web server (with respect to pages served by that web server), or by some other intermediate entity (such as a WAP server that provides web pages to wireless handheld devices).

We claim:

1. A method of measuring and using an Internet user's level of interest in a given subject the method comprising:
    at a mobile-IP home agent configured to pass IP communications to a user, (i) establishing a count of web pages sent to the user that each contains at least a threshold number of keywords related to the given subject, wherein the threshold is non-zero, and (ii) establishing a count of keywords related to the given subject that appear in web pages sent to the user, wherein establishing the count of keywords includes:
        for each web page sent to the user, establishing a capped page keyword count by counting instances of keywords related to the given subject matter that appear in the web page, wherein the capped page keyword count is capped such that its value is not greater than a predetermined maximum number of instances of keywords; and
        summing the capped page keyword counts to establish the count of keywords, wherein the count of keywords is not greater than the count of web pages multiplied by the predetermined maximum number of keywords;
    using the count of keywords as a basis to establish a measure of the user's interest in the given subject; and using the established measure of the user's interest level as a basis to provide information to the user.

2. A method of measuring and using an Internet user's interest level in a given subject, the method comprising:

at a mobile-IP home agent configured pass IP communications to a user, establishing for the user a total page count value, P, that represents a number of web pages sent to the user;

at the mobile-IP home agent, establishing for the user a subject-specific page count value, S, that represents a number web pages sent to the user that each contain at least a threshold number of keywords related to the given subject, wherein the threshold is non-zero;

at the mobile-IP home agent, establishing for the user a keyword count value, K, that represents a number of keywords related to the given subject that appear in web pages sent to the user, wherein establishing K includes:

for each web page sent to the user, establishing a capped page keyword count by counting instances of keywords related to the given subject matter that appear in the web page, wherein the capped page keyword count is capped such that its value is not greater than a predetermined maximum number of instances of keywords; and summing the capped page keyword counts to establish the count of keywords, wherein the count of keywords is not greater than the count of web pages multiplied by the predetermined maximum number of keywords; and at the mobile-IP home agent, using the values P, S and K, in combination, to establish a measure of the user's interest level in the given subject; and using the established measure of the user's interest level as a basis to provide information to the user.

3. The method of claim 2, wherein using the values P, S and K, in combination, to establish a measure of the user's interest level in the given subject comprises:

computing the measure as $(K)(S)/(P)$.

4. The method of claim 2, further comprising:

performing the method over each of a number of successive periods of time, so as to establish respectively for each period of time a measure of the user's interest level in the given subject; and combining the respective measures of the user's interest level over time to establish a composite measure of the user's interest level in the given subject.

5. The method of claim 4, wherein combining the respective measures of the user's interest level over time comprises:

adding the respective measures together.

6. The method of claim 4, further comprising maintaining a principal measure of the user's interest level, based on past respective measures, wherein combining the respective measures of the user's interest level over time comprises:

combining the principal measure with a new respective measure of the user's interest level.

7. The method of claim 6, wherein combining the principal measure with the new respective measure comprises:

taking a weighted sum of the principal measure and the new respective measure.

8. The method of claim 2, further comprising normalizing the measure of the user's interest level in the given subject.

9. A method of measuring and using an Internet user's level of interest in a given subject, the method comprising:

establishing a count of web pages sent to a user that each contains at least a threshold number of keywords related to the given subject, wherein the threshold is non-zero;

establishing a keyword count that represents a number of keywords related to the given subject that appear in web pages sent to the user, wherein establishing the keyword count includes:

for each web page sent to the user, establishing a capped page keyword count by counting instances of keywords related to the given subject matter that appear in the web page, wherein the capped page keyword count is capped such that its value is not greater than a predetermined maximum number of instances of keywords; and summing the capped page keyword counts to establish the keyword count, wherein the keyword count is not greater than the count of web pages multiplied by the predetermined maximum number of keywords; and using the count of web pages and keyword count to establish a measure of the user's interest in the given subject;

using the established measure of the user's interest level as a basis to provide information to the user.

10. The method of claim 9, wherein using the count of web pages and keyword count to establish a measure of the user's interest level in the given subject comprises:

computing the measure as the count of web pages multiplied by the keyword count.

11. The method of claim 9, wherein the threshold number of keywords is 10 keywords.

12. The method of claim 9, wherein the threshold number of keywords is a single keyword.

* * * * *